Oct. 10, 1939.  G. E. WILLEY  2,175,545
NONSKID CHAIN
Filed March 21, 1938
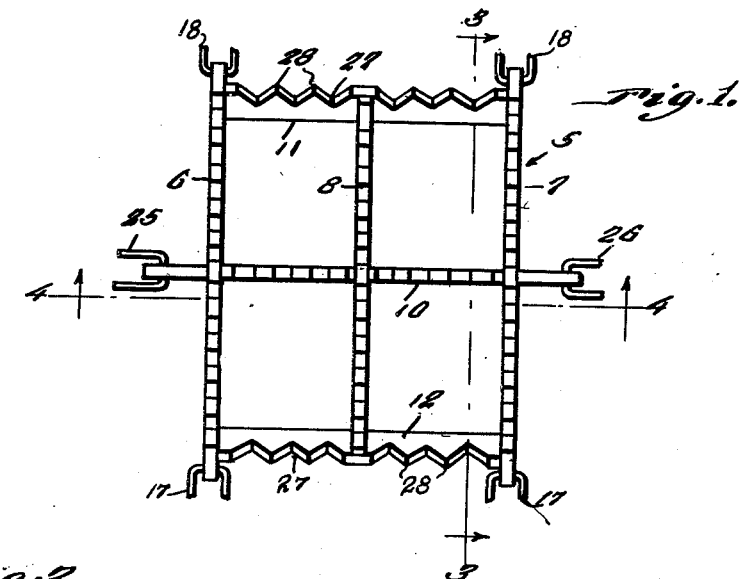
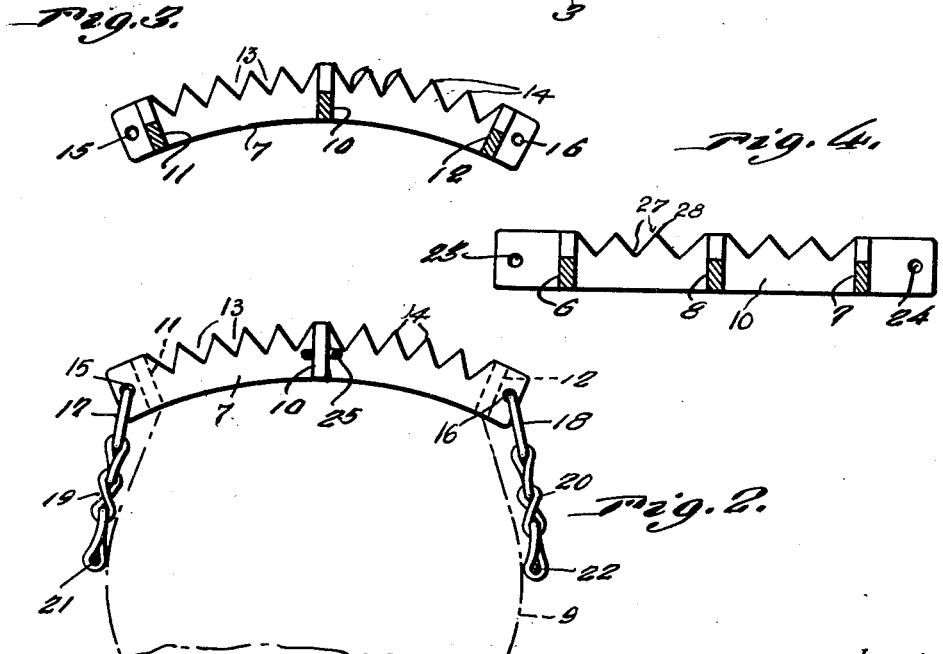
Inventor
G. E. Willey
By Clarence A. O'Brien
Hyman Berman
Attorneys

UNITED STATES PATENT OFFICE 2,175,545

NONSKID CHAIN

George E. Willey, Smyrna, Del.

Application March 21, 1938, Serial No. 197,276

1 Claim. (Cl. 152—225)

My invention relates generally to wheel tire chains, and particularly to a chain of this character especially adapted for prevention of skidding on ice, and involving a novel assembly on the tire, and an important object of my invention is to provide an improved and efficient arrangement of this character.

Other important objects of my invention will be apparent from a reading of the following description taken in connection with the drawing, wherein for purposes of illustration I have shown a preferred embodiment of my invention.

In the drawing:

Figure 1 is a top plan view of one of the non-skid elements.

Figure 2 is an end elevational view thereof.

Figure 3 is a transverse vertical sectional view taken through Figure 1 approximately on the line 3—3 and looking toward the right in the direction of the arrows.

Figure 4 is a longitudinal sectional view taken through Figure 1 approximately on the line 4—4 and looking upwardly in the direction of the arrows.

Referring in detail to the drawing, the numeral 5 generally designates one of a plurality of non-skid elements constituting the tire chain of the present invention. The element consists essentially of two similar end bars 6, 7 and an intermediate bar 8, these bars being substantially parallel and equally spaced, the end bars 6 and 7 being longer than the intermediate bar 8 and projecting beyond the ends of the intermediate bar 8 at each side of the element 5. The various bars are of substantially narrow flat material and have the curvature illustrated in Figure 2 to cause the element to conformably fit the tread of the tire 9. Connecting the middle portions of the three bars is the longitudinal bar 10 which extends longitudinally beyond both ends of the element 5 as clearly shown in Figure 1. Side bars 11 and 12 lie across the outer ends of the intermediate bar 8 and are fastened thereto and the opposite ends of these bars 11 and 12 engage the adjacent sides of the end bars 6 and 7 to which they are attached at a point inwardly of the lateral extremities of the bars 6 and 7. The connection between the various bars is produced by welding or by other suitable construction, so that the various bars are integrated into a unit.

It is to be noticed that while the intermediate bar 8 is set at a perpendicular angle, the side bars 11 and 12 are set approximately in the plane of radii with the respect to the center of curvature of the bars 6, 7 and 8, so that they are angulated with respect to the bar 8. The various bars 6, 7, 8 are set up on their edges and the top edges of the bars have notches 13 therein which define triangular or other suitably shaped teeth 14 which bite into the ice or other slippery road surface as the element is applied to the road surface in the turning of the wheels, whereby forward, rearward and lateral skidding of the wheel is positively prevented.

The projecting ends of the end bars 6 and 7 are provided with holes 15, 16, respectively, to accommodate the links 17 and 18 which are passed therethrough and which have connected thereto a series of links 19, 20 which lie along the side walls of the tire as indicated in Figure 2 of the drawing and engage with cables or chains 21, 22 which encircle the opposite sides of the wheel along the side walls of the tire thereof and tension the element 5 in place thereon.

The ends of the longitudinal bar 10 which project beyond the end bars 6 and 7 have holes 23 and 24 with which are engaged the links 25, 26 which connect the adjacent elements 5 in equally circumferentially spaced manner around the circumference of the wheel. The upper edges of the longitudinal side bars 11 and 12 also the bar 10 are formed with notches 27 defining teeth 28 similar to the teeth 14 in the other bars composing the element 5.

Although I have shown and described herein a preferred embodiment of my invention, it is to be definitely understood that I do not desire to limit the application of the invention thereto, and any change or changes may be made in the materials and in the structure and arrangement of the parts, within the spirit of the invention and the scope of the subjoined claim.

Having described the invention, what is claimed as new is:

In a non-skid armor for automobile tires, a rectangular unit of grid-like form comprising a pair of flat end bars of arcuate contour for spanning the tire transversely, a similar bar intermediate said end bars parallel therewith, a pair of straight flat side bars for location upon opposite sides of said tire, respectively, connected to said end bars, and a bar similar to the side bars intermediate the same and parallel therewith for location in the circumferential center of the tire, said bars being constructed and arranged to extend edgewise from the tire and having saw toothed outer ground-engaging edges, and the ends of the intermediate bar last mentioned extending beyond said end bars and being apertured, and chains anchored in said apertures for connection of said unit to similar units spaced from the ends thereof.

GEORGE E. WILLEY.